(12) United States Patent
Baughman et al.

(10) Patent No.: US 11,645,465 B2
(45) Date of Patent: May 9, 2023

(54) ANAPHORA RESOLUTION FOR ENHANCED CONTEXT SWITCHING

(71) Applicant: INTERNATIONAL BUSINESS MACHINES CORPORATION, Armonk, NY (US)

(72) Inventors: Aaron K. Baughman, Cary, NC (US); Mauro Marzorati, Lutz, FL (US); Gary Francis Diamanti, Wake Forest, NC (US); Nicholas Michael Wilkin, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 17/247,398

(22) Filed: Dec. 10, 2020

(65) Prior Publication Data

US 2022/0188516 A1 Jun. 16, 2022

(51) Int. Cl.
*G06F 40/284* (2020.01)
*G06F 40/253* (2020.01)
(Continued)

(52) U.S. Cl.
CPC .......... *G06F 40/284* (2020.01); *G06F 40/211* (2020.01); *G06F 40/253* (2020.01); *G06N 3/08* (2013.01)

(58) Field of Classification Search
CPC .... G06F 40/284; G06F 40/253; G06F 40/211; G06N 3/08
See application file for complete search history.

(56) References Cited

U.S. PATENT DOCUMENTS 6,233,547 B1 5/2001 Denber
7,627,590 B2 12/2009 Boguraev
(Continued)

FOREIGN PATENT DOCUMENTS

CN 106294322 A 1/2017
CN 106997346 A 8/2017
(Continued)

OTHER PUBLICATIONS

Shen, Jonathan, Rooming Pang, Ron Weiss, Mike Schuster, Navdeep Jaitly, Zongheng Yang, Z. Chen, Yu Zhang, Yuxuan Wang, RJ Skerry-Ryan, Rif Saurous, Yannis Agiomyrgiannakis, and Yonghui Wu, "Natural TTS Synthesis by Conditioning WaveNet on Mel Spectrogram Predictions", 2018, ICASSP 2018, pp. 4779-4783. (Year: 2018).*

(Continued)

*Primary Examiner* — Paras D Shah
*Assistant Examiner* — James Boggs
(74) *Attorney, Agent, or Firm* — Brandon L. Stephens (57) ABSTRACT

A computer receives a multimedia data, where the multimedia data comprises a plurality of frames. The computer converts the multimedia data into a signal wave having a plurality of frequencies and a plurality of amplitudes. The computer determines a frame from the plurality of frames having a pronoun. The computer identifies a topic of the frame. The computer searches for a frame in a media repository having a highest correlation coefficient with the topic of the frame, where the frame from the media repository comprises a bag of objects and resolves the anaphora disambiguation by substituting the pronoun with an object from the bag of objects.

20 Claims, 5 Drawing Sheets

(51) Int. Cl.
  *G06F 40/211* (2020.01)
  *G06N 3/08* (2023.01)

(56) References Cited

U.S. PATENT DOCUMENTS

| | | | |
|---|---|---|---|
| 7,813,916 | B2 | 10/2010 | Bean |
| 9,183,257 | B1 | 11/2015 | Buchanan |
| 9,424,250 | B2 | 8/2016 | Chelst |
| 9,529,793 | B1* | 12/2016 | Taubman ............... G06F 40/253 |
| 10,380,995 | B2 | 8/2019 | Li |
| 10,467,510 | B2 | 11/2019 | Albadawi |
| 10,482,885 | B1* | 11/2019 | Moniz ..................... G06F 3/167 |
| 11,323,835 | B2* | 5/2022 | Lee ....................... H04R 29/004 |
| 2013/0318121 | A1 | 11/2013 | Morton |
| 2017/0257456 | A1 | 9/2017 | Vaish |
| 2018/0247642 | A1 | 8/2018 | Kim |
| 2019/0188257 | A1 | 6/2019 | Iida |
| 2021/0142291 | A1* | 5/2021 | Laxman ............ G06F 16/90332 |
| 2022/0122579 | A1* | 4/2022 | Biadsy .................. G10L 21/003 |

FOREIGN PATENT DOCUMENTS

| | | |
|---|---|---|
| CN | 110134944 A | 8/2019 |
| CN | 106920545 B | 7/2020 |
| CN | 111401035 A | 7/2020 |
| WO | 2020073664 A1 | 4/2020 |
| WO | 2022123400 A1 | 6/2022 |

OTHER PUBLICATIONS

Peng, Puyuan, Herman Kamper, and Karen Livescu, "A Correspondence Variational Autoencoder for Unsupervised Acoustic Word Embeddings", Dec. 3, 2020, NeurIPS 2020 Workshop Self-Supervised Learning for Speech and Audio Processing, ArXiv abs/2012.02221, pp. 1-10. (Year: 2020).*

International Search Report & Written Opinion of International Application No. PCT/IB2021/061214, dated Mar. 9, 2022, 9 pages.

Bergler, "Towards reliable partial anaphora resolution," ANARESOLUTION '97: Proceedings of a Workshop on Operational Factors in Practical, Robust Anaphora Resolution for Unrestricted Texts, Jul. 1997 [accessed on May 5, 2020], pp. 62-66, Retrieved from the Internet: <URL: https://dl.acm.org/doi/abs/10.5555/1598819.1598828>.

Carbonell, et al., "Anaphora resolution: a multi-strategy approach," COLING '88: Proceedings of the 12th conference on Computational linguistics, Aug. 1988 [accessed on May 5, 2020], pp. 96-101, vol. 1, Retrieved from the Internet: <URL: https://doi.org/10.3115/991635.991656>.

Fan, et al., "Indirect anaphora resolution as semantic path search," K-CAP '05: Proceedings of the 3rd international conference on Knowledge capture, Oct. 2005 [accessed on May 5, 2020], pp. 153-160, Retrieved from the Internet: <URL: https://doi.org/10.1145/1088622.1088650>.

Gil, "Unrestricted Bridging Anaphora Resolution using Lexical Information," Doctoral dissertation from Instituto Politécnico Nacional, Dec. 2019, 62 pages, MX.

Kucuk, et al., "Identification of coreferential chains in video texts for semantic annotation of news videos," 2008 23rd International Symposium on Computer and Information Sciences, , 2008 [accessed on May 5, 2020], 6 pages, doi: 10.1109/ISCIS.2008.4717886, Istanbul, TR, Retrieved from the Internet: <URL: https://ieeexplore.ieee.org/stamp/stamp.jsp?tp=&arnumber=4717886>.

Passos, et al., "Lexicon Infused Phrase Embeddings for Named Entity Resolution," arXiv preprint, Apr. 22, 2014, 9 pages.

Rodriguez, et al., "Anaphoric Annotation of Wikipedia and Blogs in the Live Memories Corpus," Apr. 2010, 7 pages.

Sukthanker, et al., "Anaphora and Coreference Resolution: A Review," Artificial Intelligence Review manuscript, May 30, 2018, 45 pages.

Yeh, et al., "Zero anaphora resolution in Chinese with partial parsing based on centering theory," International Conference on Natural Language Processing and Knowledge Engineering, 2003 [accessed on May 5, 2020], pp. 683-688, IEEE, Bejing, CN, retrieved from the Internet: <URL: https://ieeexplore.ieee.org/stamp/stamp.jsp?tp=&arnumber=1275992>.

Mell, et al., "The NIST Definition of Cloud Computing", National Institute of Standards and Technology, Special Publication 800-145, Sep. 2011, 7 pages.

\* cited by examiner

ANAPHORA RESOLUTION FOR ENHANCED CONTEXT SWITCHING

BACKGROUND

The present invention relates, generally, to the field of computing, and more particularly to natural language processing.

Natural language processing (NLP) is a field of computer science, artificial intelligence, and computational linguistics related to the interactions between computers and human natural languages, such as programming computers to process multimedia files that incorporate large natural language corpora. Typically, the artificial intelligence component for NLP incorporates one or more neural networks that were trained to recognize or process natural language.

A neural network is a computational model in computer science that is based on a collection of neural units. Each neural unit is an artificial neuron that may be connected with other neural units to create a neural network. The neural network may then be trained to find a solution to a problem where a traditional computer program fails, such as NLP of a text or word embedding.

SUMMARY

According to one embodiment, a method, computer system, and computer program product for anaphora disambiguation is provided. The present invention may include a computer that receives a multimedia, data, where the multimedia data comprises a plurality of frames. The computer converts the multimedia data into a signal wave having a plurality of frequencies and a plurality of amplitudes. The computer determines a frame from the plurality of frames having a pronoun. The computer identifies a topic of the frame. The computer searches for a frame in a media repository having a highest correlation coefficient with the topic of the frame, where the frame from the media repository comprises a bag of objects and resolves the anaphora disambiguation by substituting the pronoun with an object from the bag of objects.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, NLP is a field of computer science, artificial intelligence, and computational linguistics related to the interactions between computers and human natural languages such as programming computers to process multimedia files that incorporate large natural language corpora.

Throughout a workday, employees multitask to sustain many different roles required to support a business. For example, many software developers work in different languages on a variety of projects. The software developer might also engage with social media, marketing, inventing, project management and recruitment. Many sources of information are consumed to achieve a task. At the same time, employees watch videos and listen to podcasts to help them solve a task. Many of the learning styles are indirect forms and occur within the background while a person works on a task. As a person is both changing tasks and consuming media, a human conflates ambiguous pronouns with a previous context or an unrelated source.

An anaphora is a phenomenon in a natural language when the use of one word (typically a pronoun) refers to or replaces a different word used previously in a sentence, to avoid repetition. For example, in a sentence "Susan dropped the plate; it shattered loudly", the pronoun "it" refers to the plate. Anaphora may also refer not to the antecedent, but a complement to the antecedent. For example, in a sentence only a few of the children ate their ice-cream; they threw it around the room instead" the anaphora "they" refers not to the children that ate the ice cream hut rather to the children who did not eat the ice cream.

Disambiguating the anaphora may assist not only for the NLP processing of the multimedia content that uses natural language but also may be beneficial for cognitively impaired consumers of a multimedia content such as while watching videos or listening to a podcast. As such, it may be advantageous to, among other things, implement a system that resolves an anaphora in a natural language based on converting a part of the natural language into a signal and resolve the anaphora based on determining a similar signal.

According to one embodiment, an anaphora disambiguation process may be used to extract natural language data from the multimedia file and, after converting it to a plurality of sine waves, compare it to the repository of previously resolved anaphora waves and, based on determining similarity, resolve the anaphora with the resolved anaphora having the highest similarity wave pattern.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to perform anaphora disambiguation in multimedia data by converting chunks of the data into a plurality of sine waves each wave having an amplitude and a frequency and by comparing the sine waves based on their amplitude and frequency to the waves associated with related repository data, and resolving the ambiguity by injecting the anaphora resolution.

Figure 1:
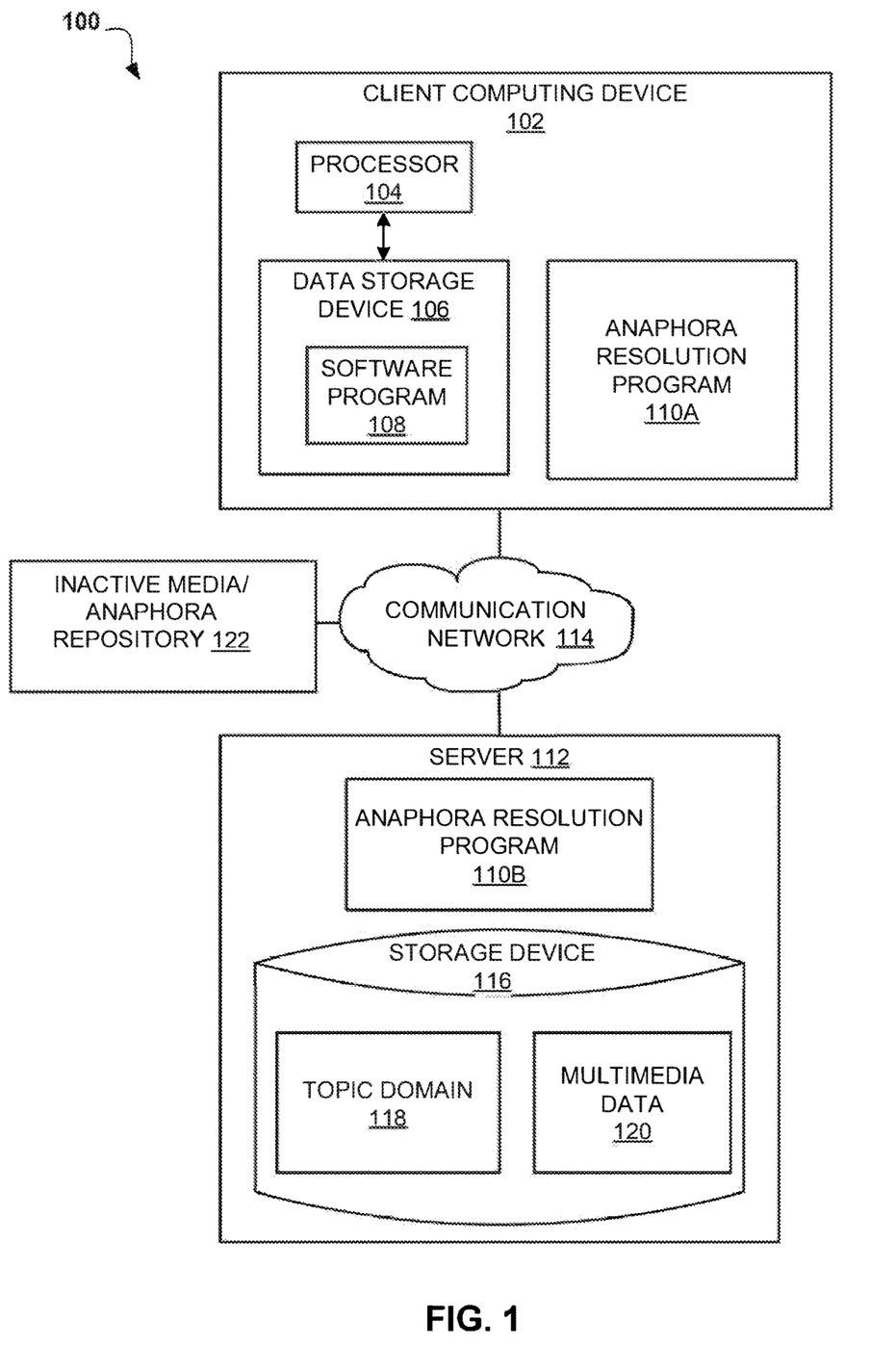
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112 and an anaphora repository 122 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an anaphora disambiguation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an anaphora disambiguation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Topic domain 118 may be a database that stores topic domains in buckets along with previously resolved anaphora stored as plurality of objects or a bag of words. The topic domains are extracted from the inactive media repository 122 using NLP methods, such as by word embedding algorithms or a trained neural network that may extract topics from natural language text.

The anaphora repository 122 may be a database, any programmable electronic device, or any network of databases and/or programmable electronic devices capable of hosting and storing a plurality of multimedia data such as video streams, voice streams, text, voice files and video files. In another embodiment, anaphora repository 122 may be dynamically determined using the search functionality of a web browser.

According to the present embodiment, the anaphora disambiguation program 110A, 110B may be a program capable of analyzing natural language, determining one or more anaphora statements and performing pronoun disambiguation by converting anaphora statements into a signal and comparing the signal to previously resolved or inactive media using wave similarity. The anaphora disambiguation method is explained in further detail below with respect to FIG. 2.

Figure 2:
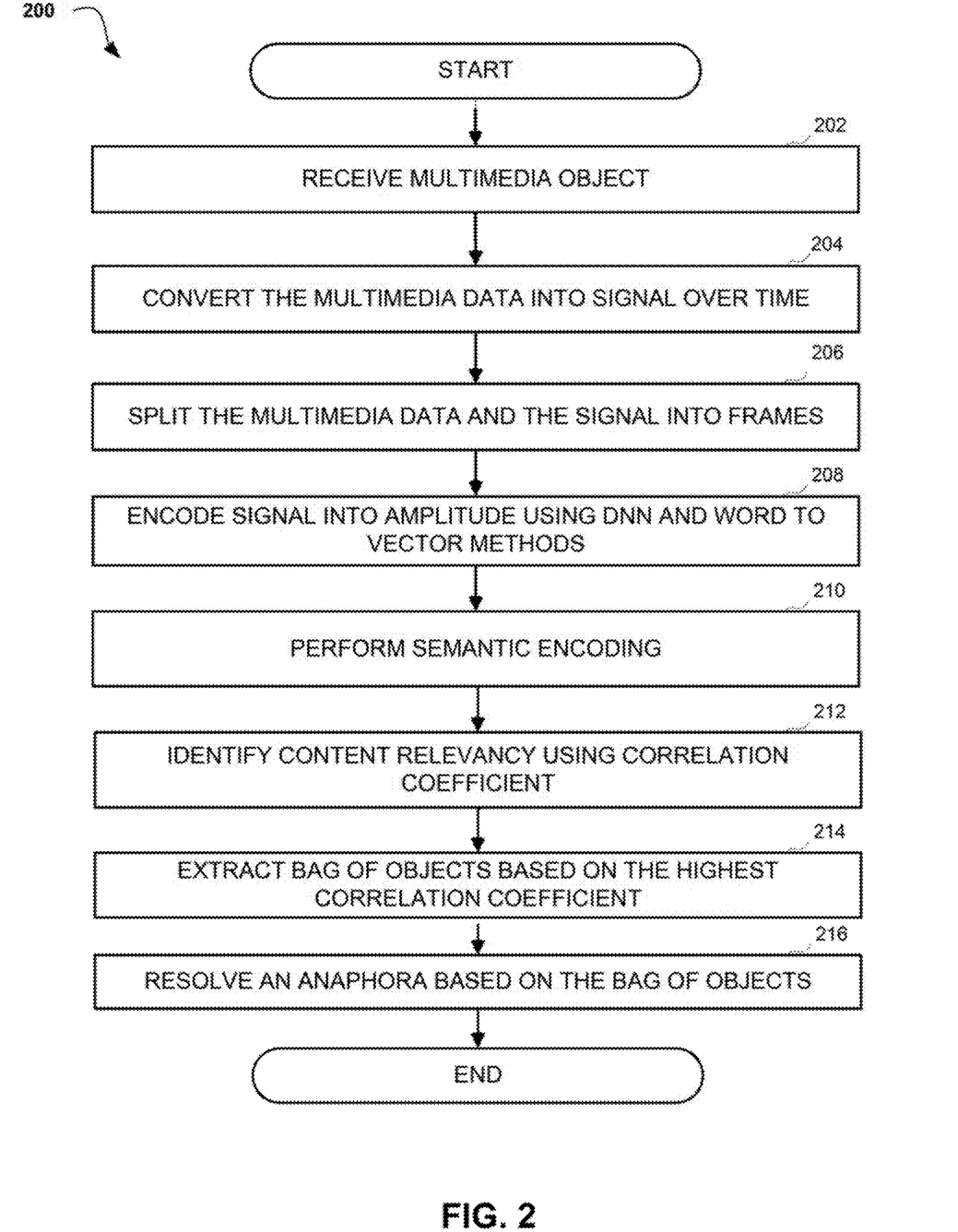
FIG. 2 is an operational flowchart illustrating an anaphora disambiguation process according to at least one embodiment.

Referring now to FIG. 2, an operational flowchart illustrating an anaphora disambiguation process 200 is depicted according to at least one embodiment. At 202, the anaphora disambiguation program 110A, 110B receives a multimedia object. The multimedia object may be a file of any type, such as audio, video, or text, or a data stream having a natural language, presented in any form, that may be converted to text. According to an example embodiment, the anaphora disambiguation program 110A, 110B may receive the multimedia object from a client computing device 102.

Next, at 204, the anaphora disambiguation program 110A, 110B converts the multimedia object into a signal over time (i.e., a wave). According to an example embodiment, the anaphora disambiguation program 110A, 110B may convert the multimedia object into a signal wave by extracting audio data or if the multimedia object incorporates text, by convert the text into audio using an amplitude auto decoder neural network that converts the text into amplitude values and each value is assign a timeframe associated with the time the value was generated. In another embodiment, the anaphora disambiguation program 110A, 110B may convert the multimedia object into text using speech-to-text and then apply a trained neural network that converts text into a plurality of amplitudes over time using the auto decoder neural network. In addition, the anaphora disambiguation program 110A, 110B may transfer the generated signal into a frequency spectrum using Fourier transform and convert the signal into a sum of infinite sine waves for future comparison (see steps 210 and 212 below).

According to an example embodiment, the anaphora disambiguation program 110A, 110B may transform the signal into a sum of infinite sine waves using an equation $X_k = \Sigma_{n=0}^{N-1} x_n e^{-2\pi ikn/N}$, where N is a number of samples, n is a current sample, $x_n$ is a value of the signal at time n, k is a current frequency (from 0 Hz to N-1 Hz), and $X_k$ is a result of the discrete Fourier transform(DFT).

The anaphora disambiguation program 110A, 110B may determine a frequency and phase of the generated signal by breaking the signal into time chunks (frames) using a spectrogram approach. According to an example embodiment, the anaphora disambiguation program 110A, 110B may generate a spectrogram by a related Fast Fourier Transform, such as continuous time short-term Fourier transform algorithm (STFT). Using the determined frequency and phase the signal may be plotted using equation $X_k = \Sigma_{n=0}^{N-1} x_n (x_n - m) e^{-2\pi ikn/N}$, where N is a number of samples, n is a current sample, $x_n$ is a value of the signal at time n, k is a current frequency (from 0 Hz to N-1 Hz), and $X_k$ is a result of the DFT (amplitude and phase), W is a look back window function, and m is a time to look back.

The look back window w may be parametrized with time to look back value by using equation $X_k = \Sigma_{n=0}^{N-1} x_n w(x_n - m) e^{-2\pi ikn/N}$, where the parameter m may be learned over time by analyzing the background information. The background information that adjusts the parameter m may be based on information entropy and topic depth. The topic depth may be measured using a principle topic that is covered in the frame. When the principle topic changes, the length of value m may be adjusted accordingly. The entropy (X) may be determined using equation $H(X) = -\Sigma_{i=1}^{n} P(x_i) \log P(x_i)$.

Next, at 206, the anaphora disambiguation program 110A, 110B splits the multimedia data and the signal into frames. According to an example embodiment, the anaphora disambiguation program 110A, 110B may separate the multimedia object and the associated signal into frames over a duration of time where one or more frames make include an anaphora. The time duration of each frame may be determined based on the time to look back value m as determined in the previous step.

Then, at 208, the anaphora disambiguation program 110A, 110B encodes the signal into an amplitude value using deep neural network (DNN) and word-to-vector methods. According to an example embodiment, the anaphora disambiguation program 110A, 110B may use DNN to label the main object in each frame where the long-short term memory (LSTM) method may be applied to encode each frame, where the label may be associated with one or more topics in the topic domain 118. For each object a vector describing the object may be generated that includes velocity, acceleration, and label. If the multimedia object is a video content, hue colors may be added to the vector as one of the parameters. In instances when the DNN may not determine a label for the object, the anaphora disambiguation program 110A, 110B may determine a similar word for the label using word to vector mapping (i.e., word embedding) method. In further embodiments, the amplitudes of each of the encoded frames may be averaged.

Next, at 210, the anaphora disambiguation program 110A, 110B performs semantic encoding. According to an example embodiment, if anaphora disambiguation cannot be located by searching the topic domain 118 with the determined label, the anaphora disambiguation program 110A, 110B may perform semantic encoding by identifying a relationship between the object and a plurality of objects in the inactive media repository 122 using sine wave signal decomposition. According to an example embodiment, the anaphora disambiguation program 110A, 110B may decompose the relationships between a pair of objects using discrete Fourier Transform (DFT).

Then, at 212, the anaphora disambiguation program 110A, 110B identifies content relevancy using a correlation coefficient. According to an example embodiment, the anaphora disambiguation program 110A, 110B may compare the signal of a current object to a plurality of objects in the inactive media repository 122 using a spectrogram, such as a time-versus-amplitude spectrogram and frequency-versus-amplitude spectrogram. According to an example embodiment, the anaphora disambiguation program 110A, 110B may apply fractional DFT to find principal wave forms using an equation $F^n[f]=F[F^{n-1}[f]]$ and $F^n=(F^{-1})^n$, where $F[f]$ is a continuous Fourier transform of a function $f$ (i.e., signal generated from each object), n is a non-negative integer, and $F^0[f]=f$. According to an example embodiment, the anaphora disambiguation program 110A, 110B may identify a correlation between a principal wave form of one or more objects in the inactive media repository 122 and the identified object that may include an anaphora in the frame from the multimedia data 120. According to an example embodiment, the anaphora disambiguation program 110A, 110B may determine that the highest correlated coefficients between the principal wave in the inactive media repository 122 and the identified object may be associated with the anaphora disambiguation.

Next, at 214, the anaphora disambiguation program 110A, 110B extracts a bag of objects based on the highest correlated coefficient. According to an example embodiment, the anaphora disambiguation program 110A, 110B may determine all pronouns in the multimedia data 120 and identify a bag of objects, or a bag of words, in the inactive media repository 122 that is associated with the highest correlated coefficient. According to an example embodiment, the anaphora disambiguation program 110A, 110B may determine all the pronouns based on converting each of the frames to text using a speech to text DNN and searching the text with all the available pronouns to identify the frames with pronouns that require disambiguation.

Then, at 216, the anaphora disambiguation program 110A, 110B resolves an anaphora based on the bag of objects. According to an example embodiment, the anaphora disambiguation program 110A, 110B may substitute the word from the bag of words that has a highest correlated coefficient with the determined pronoun. For example, the anaphora disambiguation program 110A, 110B may substitute a pronoun in the text with one of the words in the bag of words and incorporate the text in the multimedia data 120, such as a caption in the video. In another embodiment, the anaphora disambiguation program 110A, 110B may substitute a corresponding frame from the multimedia data 120 having a pronoun with the frame from the inactive media repository 122 having the highest correlated coefficient.

It may be appreciated that FIG. 2 provides only an illustration of one implementation and does not imply any limitations with regard to how different embodiments may be implemented. Many modifications to the depicted environments may be made based on design and implementation requirements.

Figure 3:
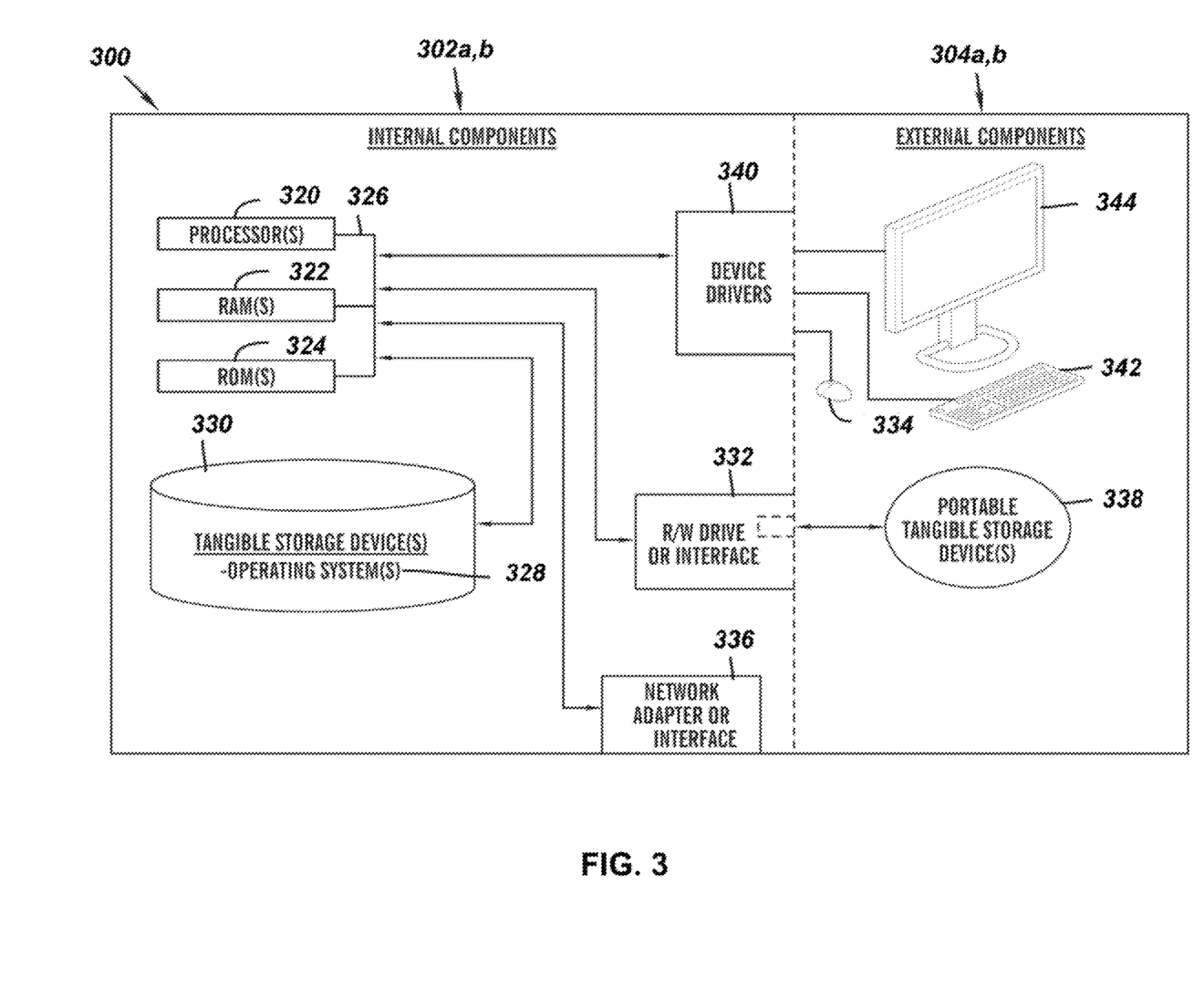
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may be represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 *a,b* and external components 304 *a,b* illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the anaphora disambiguation program 110A in the client computing device 102, and the anaphora disambiguation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective RAY drive or interface 332, and loaded into the respective hard drive 330.

Each set of internal components 302 a,b also includes network adapters or interfaces 336 such as a TCP/IP adapter cards, wireless Wi-Fi® interface cards, or 3G or 4G wireless interface cards or other wired or wireless communication links. The software program 108 and the anaphora disambiguation program 110A in the client computing device 102 and the anaphora disambiguation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the anaphora disambiguation program 110A in the client computing device 102 and the anaphora disambiguation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
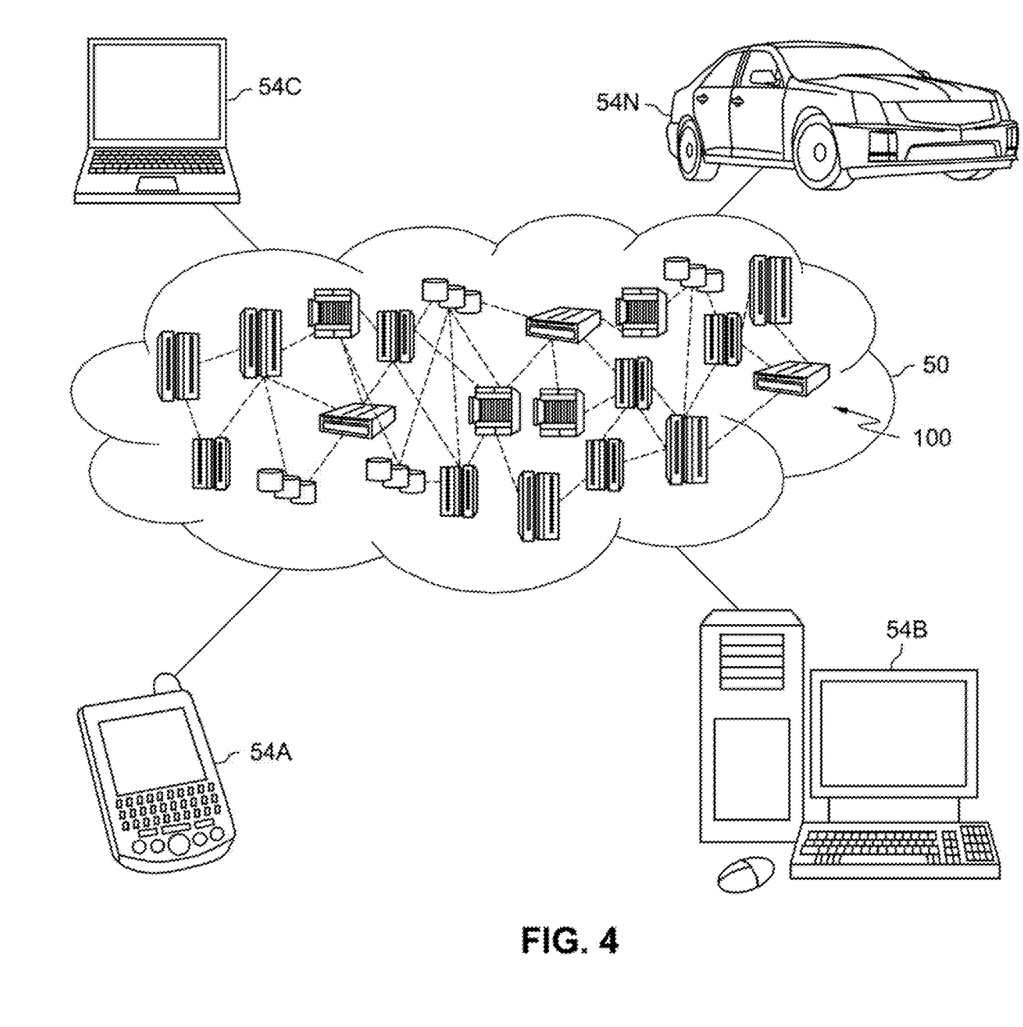
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
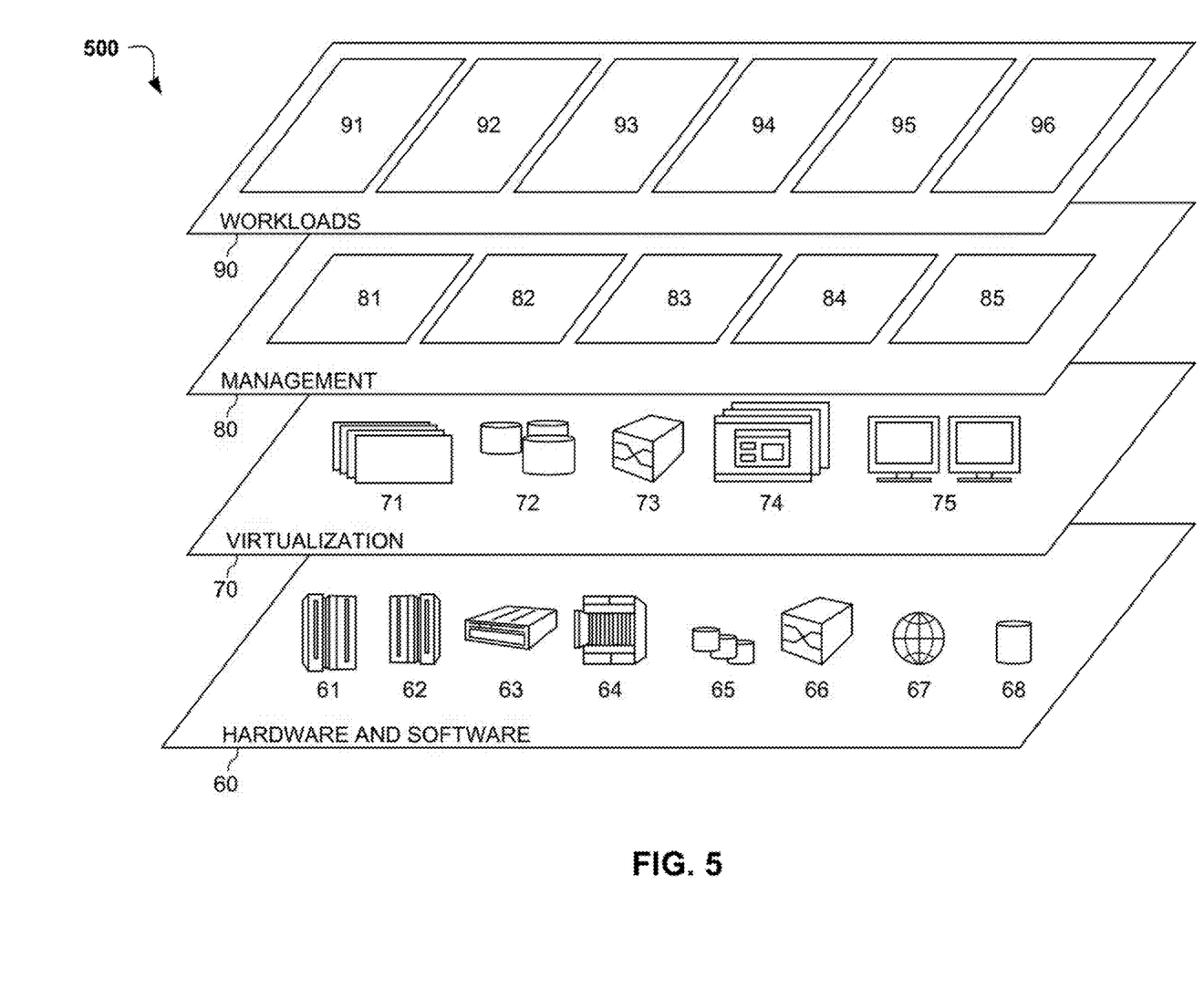
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anaphora disambiguation 96. Anaphora disambiguation 96 may relate to identifying pronouns in multimedia data and by converting the pronoun frame to a wave signal searching the inactive media repository for one or more frames having a signal wave that has a highest correlation coefficient to the signal wave of the frame with the pronoun, and substituting the pronoun with a topic from the frame having the highest correlation coefficient.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for anaphora disambiguation, the method comprising:
   receiving multimedia data, wherein the multimedia data comprises a plurality of frames;
   converting the multimedia data into a plurality of sine waves having a plurality of frequencies and a plurality of amplitudes;
   identifying a frame from the plurality of frames having a pronoun;
   identifying a topic of the frame using a deep neural network;
   searching for a frame in a media repository having a highest correlation coefficient with the identified topic and the plurality of sine waves of the frame from the plurality of frames having the pronoun, wherein the frame from the media repository comprises a bag of objects; and
   resolving the anaphora disambiguation by substituting the pronoun with an object from the bag of objects based on the frame from the media repository having the highest correlation coefficient with the plurality of sine waves.

2. The method of claim 1, further comprising:
   converting the multimedia data into a signal wave, wherein the signal wave is converted, using a discrete Fourier transform, to the plurality of sine waves.

3. The method of claim 2, wherein each of the plurality of frames have a duration of time, and wherein the duration of time is determined based on a short-term Fourier transform of the signal wave.

4. The method of claim 2, further comprising:
   separating the signal wave into frames using a spectrogram approach.

5. The method of claim 4, wherein the highest correlation coefficient is based on the spectrogram approach.

6. The method of claim 1, further comprising:
identifying a label of the frame using the deep neural network.

7. The method of claim 6, further comprising:
generating a vector describing the object wherein the vector comprises a velocity, an acceleration, and the label.

8. A computer system for anaphora disambiguation, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving multimedia data, wherein the multimedia data comprises a plurality of frames;
converting the multimedia data into a plurality of sine waves having a plurality of frequencies and a plurality of amplitudes;
identifying a frame from the plurality of frames having a pronoun;
identifying a topic of the frame using a deep neural network;
searching for a frame in a media repository having a highest correlation coefficient with the identified topic and the plurality of sine waves of the frame from the plurality of frames having the pronoun, wherein the frame from the media repository comprises a bag of objects; and
resolving the anaphora disambiguation by substituting the pronoun with an object from the bag of objects based on the frame from the media repository having the highest correlation coefficient with the plurality of sine waves.

9. The computer system of claim 8, further comprising:
converting the multimedia data into a signal wave, wherein the signal wave is converted, using a discrete Fourier transform, to the plurality of sine waves.

10. The computer system of claim 9, wherein each of the plurality of frames have a duration of time, and wherein the duration of time is determined based on a short-term Fourier transform of the signal wave.

11. The computer system of claim 9, further comprising:
separating the signal wave into frames using a spectrogram approach.

12. The computer system of claim 11, wherein the highest correlation coefficient is based on the spectrogram approach.

13. The computer system of claim 8, further comprising:
identifying a label of the frame using the deep neural network.

14. The computer system of claim 13, further comprising generating a vector describing the object wherein the vector comprises a velocity, an acceleration, and the label.

15. A computer program product for anaphora disambiguation, the computer program product comprising:
one or more computer-readable tangible storage medium and program instructions stored on at least one of the one or more tangible storage medium, the program instructions executable by a processor, the program instructions comprising:
program instructions to receive multimedia data, wherein the multimedia data comprises a plurality of frames;
program instructions to convert the multimedia data into a plurality of sine waves having a plurality of frequencies and a plurality of amplitudes;
program instructions to identify a frame from the plurality of frames having a pronoun;
program instructions to identify a topic of the frame using a deep neural network;
program instructions to search for a frame in a media repository having a highest correlation coefficient with the identified topic and the plurality of sine waves of the frame from the plurality of frames having the pronoun, wherein the frame from the media repository comprises a bag of objects; and
program instructions to resolve the anaphora disambiguation by substituting the pronoun with an object from the bag of objects based on the frame from the media repository having the highest correlation coefficient with the plurality of sine waves.

16. The computer program product of claim 15, further comprising:
program instructions to convert the multimedia data into a signal wave, wherein the signal wave is converted, using a discrete Fourier transform, to the plurality of sine waves.

17. The computer program product of claim 16, wherein each of the plurality of frames have a duration of time, and wherein the duration of time is determined based on a short-term Fourier transform of the signal wave.

18. The computer program product of claim 16, further comprising:
program instructions to separate the signal wave into frames using a spectrogram approach.

19. The computer program product of claim 18, wherein the highest correlation coefficient is based on the spectrogram approach.

20. The computer program product of claim 15, further comprising:
program instructions to identify a label of the frame using the deep neural network.

* * * * *